United States Patent [19]
Shelekhin et al.

[11] Patent Number: 5,972,530
[45] Date of Patent: Oct. 26, 1999

[54] AIR-COOLED, HYDROGEN-AIR FUEL CELL

[75] Inventors: Alexander B. Shelekhin, Acton, Mass.; Calvin L. Bushnell, Glastonbury, Conn.; Michael S. Pien, Acton, Mass.

[73] Assignee: ElectroChem, Inc., Woburn, Mass.

[21] Appl. No.: 09/006,374

[22] Filed: Jan. 13, 1998

[51] Int. Cl.⁶ ................................................ H01M 8/04
[52] U.S. Cl. ................................................ 429/26; 429/34
[58] Field of Search .................... 429/12, 13, 26, 429/34, 38, 39; 204/193, 194, 409

[56] References Cited

U.S. PATENT DOCUMENTS

| | | | |
|---|---|---|---|
| 4,599,282 | 7/1986 | Hirota et al. | 429/26 |
| 5,503,945 | 4/1996 | Petri et al. | 429/38 X |
| 5,643,690 | 7/1997 | Tateishi et al. | 429/34 |

FOREIGN PATENT DOCUMENTS 57-158963  9/1982  Japan .

*Primary Examiner*—Maria Nuzzolillo
*Assistant Examiner*—Susy Tsang
*Attorney, Agent, or Firm*—Bruce F. Jacobs

[57] ABSTRACT

An air-cooled, hydrogen-air solid polymer electrolyte (SPE) fuel cell with a membrane electrode assembly operatively associated with a fluid flow plate having at least one plate cooling channel extending through the plate and at least one air distribution hole extending from a surface of the cathode flow field into the plate cooling channel.

17 Claims, 4 Drawing Sheets

AIR-COOLED, HYDROGEN-AIR FUEL CELL

U.S. GOVERNMENT RIGHTS

The U.S. government has rights in this invention in view of NASA contract NAS3-27242.

FIELD OF THE INVENTION

The invention relates to the field of hydrogen-air solid polymer electrolyte (SPE) fuel cells.

BACKGROUND OF THE INVENTION

A typical solid polymer electrolyte membrane fuel cell with a single cell assembly includes a housing with (i) a membrane electrode assembly which comprises a solid polymer electrolyte membrane sandwiched between an anode and a cathode, (ii) an anode fluid flow plate, and (iii) a cathode fluid flow plate. The anode fluid flow plate contains an anode flow field with reactant channels for distributing a fuel to the anode. The cathode fluid flow plate has a cathode flow field with reactant channels for distributing an oxidant to the cathode. The fluid flow plates also separate the fuel from the oxidant during cell operation and provide an electrical connection between the anode and the cathode. During operation, appropriate fuel and oxidant are supplied to the anode flow field and the cathode flow field, respectively, the fuel and the oxidant react at the electrodes to generate electrical current, and product water is produced and withdrawn from the cell.

A typical solid polymer electrolyte membrane solid fuel cell having a "stack assembly" operates in a similar manner in a housing with at least two membrane electrode assemblies that are operatively associated with a plurality of "bi-polar" plates, i.e. plates having an anode flow field on one major face of the plate and a cathode flow field on the opposite side.

Conventional solid polymer electrolyte membrane (SPE) fuel cells utilizing hydrogen and air as reactants have several limitations that have made them unsuitable in many applications. Conventional hydrogen/air fuel cells are typically cooled by liquid cooling systems that increase both the manufacturing and the operating costs of the fuel cells. U.S. Pat. No. 5,230,966, for example, discloses a liquid coolant field plate with a coolant network means and a means for attaching the plate to a cell. Japanese Patent 92-175748 discloses a fuel cell having a cooling plate sandwiched between a pair of separator plates. It would be desirable to develop a fuel cell that is air-cooled and that operates without a liquid cooling system.

"Water management" is an important problem in fuel cell design. Water management involves providing the cell with a sufficient amount of water to humidify the membrane and anode. Water management also involves removing water from the cell to prevent the product water from agglomerating and clogging reactant channels. To humidify the membrane and an anode during operation, conventional SPE cells need to draw water from external sources. In a conventional hydrogen/air fuel cell, the membrane would dehydrate if it is operated at a relatively high current. As the membrane dries, the internal resistance of the cell increases, and the power output of the cell is substantially reduced. It is also well known that an anode's resistance to the transport of ions increases if the anode dries. Water must be introduced into the cell to avoid this from happening. U.S. Pat. No. 4,824,741, for instance, discloses a SPE fuel cell having a means for pumping water into a porous anode field plate to moisten and cool the electrolyte membrane. Water is also introduced into the cell by combining hydrogen (or air) with water. It would be desirable to develop a fuel cell that does not require systems to introduce water into the cell.

To avoid clogged reactant channels, compressors are frequently used to exhaust product water generated in conventional SPE cells. In a typical SPE cell, product water (if not removed) clogs cathode reactant channels and lowers the performance of the cell. To avoid this from happening, compressors exhaust product water from the cell. The use of a compressor adds expense and complexity to the system. It would be desirable to develop a fuel cell that does not require the use of compressors to exhaust product water from the cell.

Accordingly, it is object of this invention to develop a fuel cell that overcomes the above problems.

It is a further object of this invention to develop a fuel cell that is air cooled and that operates without a liquid cooling system.

It is a further object of this invention to develop a fuel cell that does not require water from an external source to be introduced into the cell.

It is a further object of this invention to develop a fuel cell that does not require compressors to exhaust product water from channels during fuel cell operation.

It is a further object of this invention to develop a fuel cell that is self-humidifying.

It is a further object of this invention to develop a method for using the above-named fuel cells.

These and still further objects are apparent from the following description of this invention.

SUMMARY OF THE INVENTION

The invention is directed to an air-cooled, hydrogen-air solid polymer electrolyte fuel cell with a membrane electrode assembly operatively associated with a fluid flow plate having at least one plate cooling channel extending from a first side of the plate to a second side of the plate and at least one air distribution hole extending from a surface of the cathode flow field into the plate cooling channel.

DETAILED DESCRIPTION OF PREFERRED EMBODIMENTS

Figure 1:
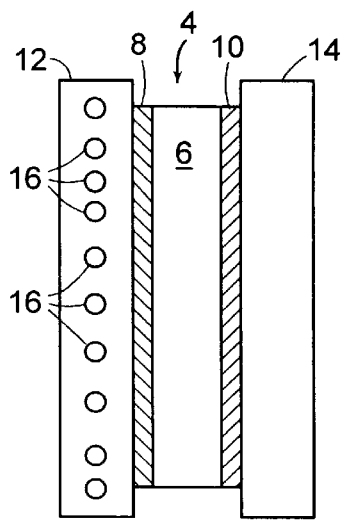
FIG. 1 shows a side view of a single cell assembly used in a fuel cell of this invention.
Figure 3:
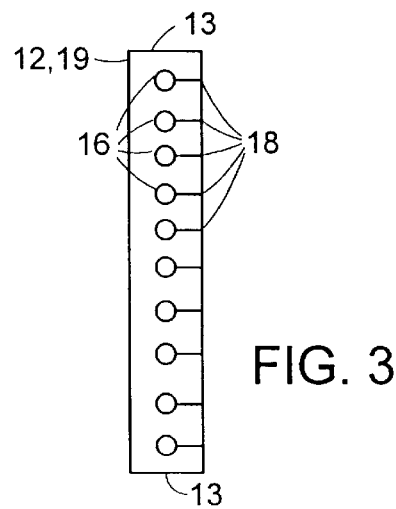
FIG. 3 shows a side view of a fluid flow plate with air distribution holes extending into plate cooling channels.

The fuel cell may have either a single cell assembly or a stack assembly. As shown in FIG. 1, a single cell assembly (housing not shown) has one membrane electrode assembly 4 that includes a solid polymer electrolyte membrane 6 sandwiched between a cathode 8 and an anode 10. The membrane electrode assembly 4 is operatively associated with a pair of opposing cathode and anode fluid flow plates 12 and 14. The cathode fluid flow plate 12 has a plurality of plate cooling channels 16 that extend through the plate from one side 13 of the plate to the opposite end of the plate (not shown). The cathode fluid flow plate 12 also has a cathode flow field 20 and a plurality of air distribution holes 18, as best seen in FIG. 3, that extend from the surface of the cathode flow field into the plate cooling channels 16.

Figure 2:
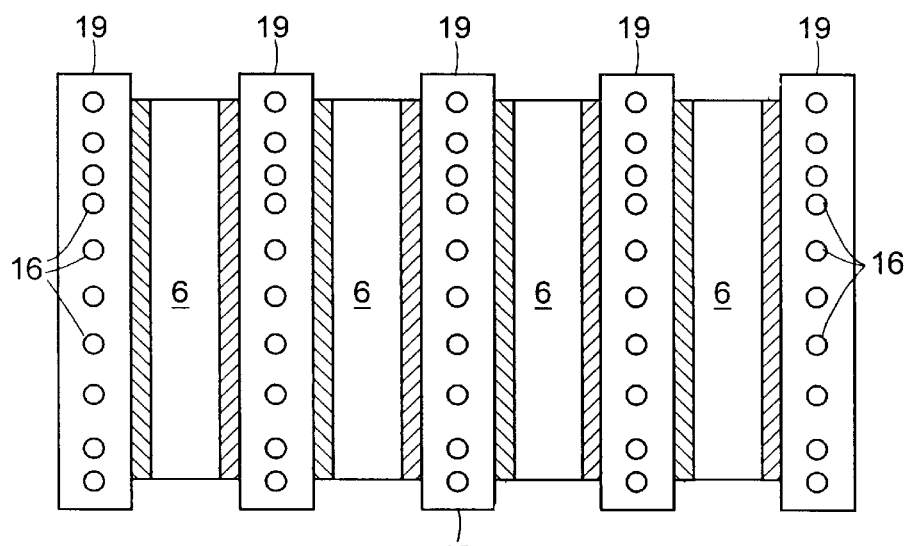
FIG. 2 shows a side view of a stack assembly of a fuel cell of this invention.
Figure 4:
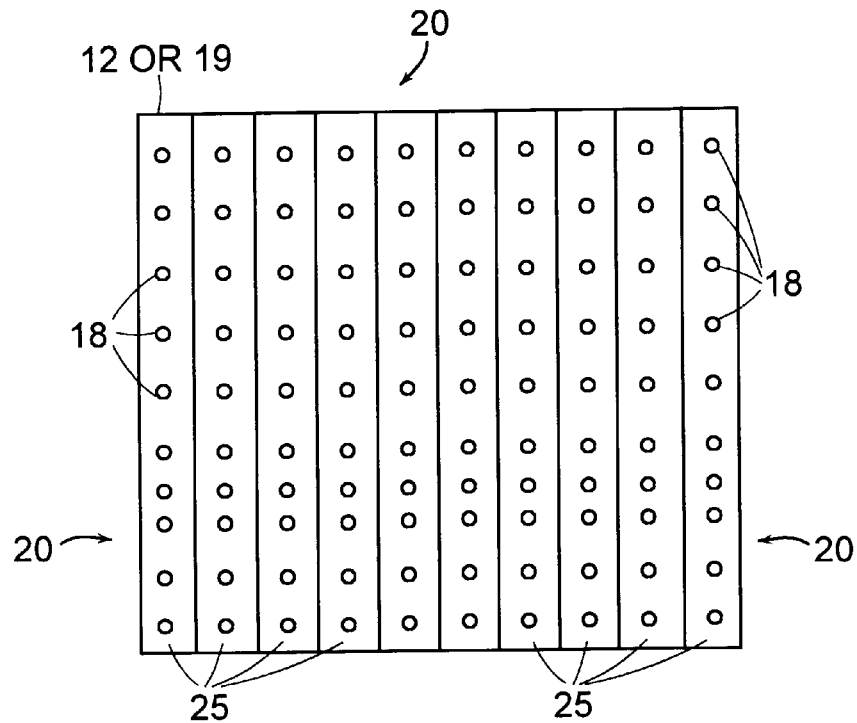
FIG. 4 shows a front view of a cathode flow field of a fluid flow plate of this invention.
Figure 5:
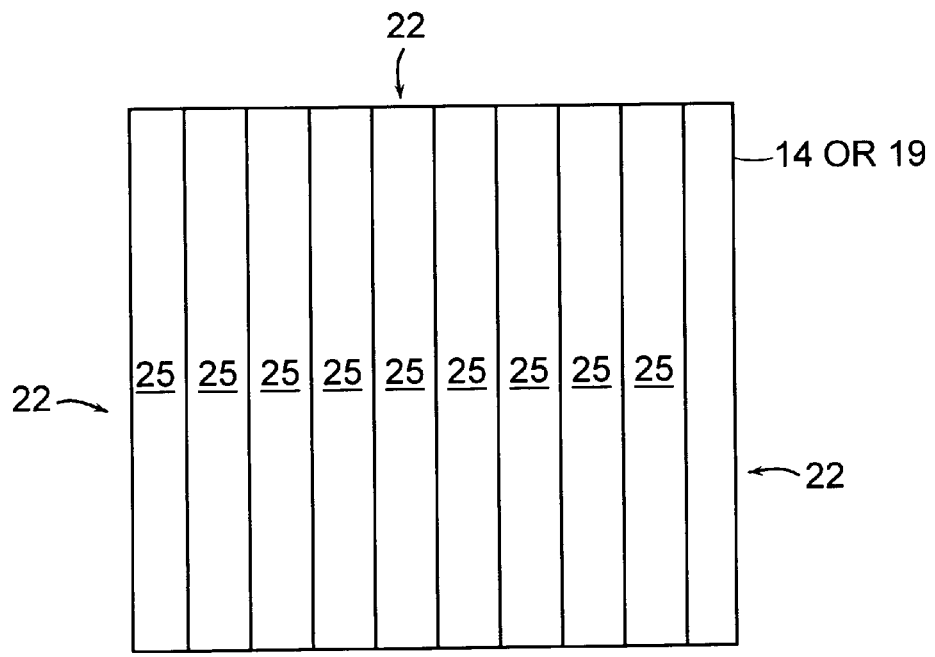
FIG. 5 shows a front view of an anode field of a fluid flow plate of this invention.

Alternatively, as shown in FIG. 2., a stack assembly has two or more membrane electrode assemblies 6 that are operatively associated with two or more "bipolar" fluid flow plates 19 that have a plurality of plate cooling channels 16 and a plurality of air distribution holes 18. As shown in FIGS. 4 and 5, the bipolar fluid flow plates 19 have a cathode flow field 20 on one major surface and an anode flow field 22 on opposite major surface.

The solid polymer electrolyte membrane 6 is made from any material useful as a solid polymer electrolyte membrane, e.g. Nafion® fluoropolymer, available from Dupont. SPE membranes available from Asahi Chemical Industry Company are also suitable. Other structurally or functionally equivalent membranes are within the scope of this invention. The cathode 8 and anode 10 are generally covered with catalysts including, but not limited to metals, metal oxides and metal alloys from group VIII of the Periodic Chart of the elements. The membrane 6 may be sandwiched between the cathode 8 and the anode 10 by any technique that enables the membrane to be attached to the cathode and the anode.

The fluid flow plates 12, 14, and 19 are made from materials that are sufficiently electrically conductive to enable the plate to function as an electrical contact between the anode and the cathode. The material must be sufficiently strong to withstand the fuel cell operating conditions. Also the material must be chemically inert. Graphite is the preferred material. Other suitable materials include titanium, niobium, titanium oxide, stainless steel, carbon composites, as well as electroplated materials. Other structurally or functionally equivalent materials are within the scope of this invention.

The thickness of cathode and anode fluid flow plates 12, 14 is ordinarily at least 1 mm. Suitable thicknesses may range from about 1 to about 50 mm, more preferably from about 1 to about 6 mm. The plates may have other thicknesses. The plate 12, 14, or 19 has a width ordinarily ranging from about 10 to about 750 mm, more preferably from about 100 to about 300 mm, and even more preferably from about 150 to about 250 mm. The plate 12, 14, or 19 has a height ordinarily ranging from about 10 to about 750 mm, more preferably from about 100 to about 300 mm, and even more preferably from about 150 to about 250 mm. The plate may have other dimensions, depending on factors such as the power requirements, the type of assembly used (single cell assembly vs. stack assembly), the space available for a power supply.

The bipolar plate 19 ordinarily has a thickness that ranges from about 3 to about 30 mm, more preferably from about 4 to about 10 mm, and even more preferably from about 5 to about 9 mm. The plate 19 has a width that ordinarily ranges from about 10 to about 750 mm, more preferably from about 100 to about 300 mm, and even more preferably from about 150 to about 250 mm. The plate 19 has a height that ordinarily ranges from about 10 to about 750 mm, more preferably from about 100 to about 300 mm, and even more preferably from about 150 to about 250 mm. Plates having other dimensions are within the scope of this invention. Factors that may affect the dimensions include but are not limited to power requirements, the type of assembly used, and the space available for the cell.

The plate cooling channel 16 extends through the plate from a first side of the plate to the opposite side so that air introduced at the first side of the plate can exit out through the opposite side. The surface area of the plate cooling channels 16 generally comprises at least 2% of the surface area of a side of the plate, generally from about 2 to about 30%, more preferably from about 4 to about 25%, and even more preferably from about 6 to about 20% of the surface area of a side of the plate. The number of plate cooling channels may vary. The cathode or bipolar fluid flow plates have at least one plate cooling channel 16. Preferably, the plates have several plate cooling channels. When a side of a fluid flow plate has a surface area ranging from about 5 to about 15 $cm^2$, the side typically has from about 5 to 35, more preferably from about 10 to about 30, and even more preferably from about 15 to about 25 plate cooling channels. When a side of a fluid flow plate has a surface area ranging from about 15 to 30 $cm^2$, the side typically has from about 15 to 105, more preferably from about 30 to about 90, and even more preferably from about 45 to about 75 plate cooling channels. Preferably, the plate cooling channels are circular and have diameters that range from about 0.1 to about 0.5 cm, more preferably from about 0.2 to about 0.4 cm, and even more preferably from about 0.3 to about 0.4 cm. The plate cooling channels 16 are made by any means that forms channels through the plate, i.e. drilling. Preferably, the anode fluid flow field 22 also has plate cooling channels.

The cathode flow field 20 of fluid flow plates 12 or 19 have air distribution holes 18 extending from the surface of a reactant channel 25 into a plate cooling channel 16. Preferably, the cathode flow field 20 has many air distribution holes 18 that have a combined surface area on the cathode fluid flow field that ranges from about 5 to about 50%, more preferably from about 10 to about 35% and even more preferably from about 15 to about 25% the total surface area of the cathode flow field. In cathode flow fields having a total surface area of at least 225 $cm^2$, the cathode flow field generally has from about 100 and about 1,000, more preferably from about 200 and about 800 and even more preferably from about 350 and 600 air distribution holes 18. In cathode flow fields having a total surface area that is less than 500 $cm^2$, the cathode flow field ordinarily has from about 200 to about 2,000, more preferably from about 400 to about 1,600, and even more preferably from about 700 to about 1200 air distribution holes 18. The air distribution holes 18 are generally circular, square, or rectangular and have diameters that range from about 1 to about 5, more preferably from about 2 to about 4, and even more preferably from about 3 to about 4 mm. The air distribution holes 18 are made by drilling or any other suitable means. Factors that may affect the dimensions of the air distribution holes (or plate cooling channels) include power requirements, plate size, water surface tension, separator plate surface wetting properties, and the properties of the hydrophilic strips.

Each flow field 20 or 22 includes a plurality of reactant channels 25 that distribute a reactant to the cathode or the anode during operation of the cell as shown in FIGS. 4 and 5. Preferably, the cathode flow field 20 and the anode flow field 22 have vertically-disposed reactant channels 25 to facilitate removal of product water by gravity. Flow fields having reactant channels in other patterns may be used.

The width of the reactant channels 25 generally ranges from about 1 to about 20 mm, more preferably from about 1.5 to about 5 mm, and even more preferably from about 2 to 4 mm. The length of the reactant channels of a flow field generally ranges from about at least about 75 to about 500 mm, more preferably from about at least about 100 to about 300 mm, and even more preferably from about at least about 150 to about 250 mm. The reactant channels generally extend into a fluid flow plate and thus have a thickness of from about 1 to about 3 mm, more preferably from about 1 to about 2.5 mm, and even more preferably from about 1 to about 2 mm. The reactant channels may be prepared by machining, molding, stamping or any other suitable technique.

The surface area of the cathode flow field 20 and the anode flow field 22 varies. The flow fields 20 and 22 have surface areas that are normally from about 50 to about 90%, more preferably from about 60 to about 85%, and even more preferably from about 70 to about 80% the surface area of a major surface of a fluid flow plate. In applications requiring relatively low power, i.e. 15 watts/plate or less, the surface area of a flow field is usually from about 100 to 200 $cm^2$ more preferably from about 125 to 175 $cm^2$, and even more preferably from about 140 to about 160 $cm^2$. In applications requiring more power, e.g. at least 60 watts/plate, the surface area of a flow field 20, 22 generally ranges from about 400 to about 800 $cm^2$, more preferably from about 500 to about 700 $cm^2$, and even more preferably from about 560 to about 640 $cm^2$. The surface area depends on many factors, e.g. the load on the cell, the number of plates used, the rate at which reactants are introduced into the plate, and the like.

Figure 6:
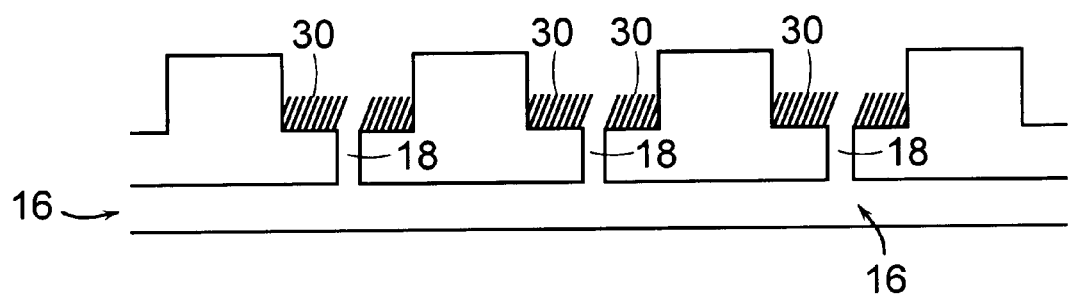
FIG. 6 shows a cross-sectional view of a cathode fluid flow field with hydrophilic strips.
Figure 7:
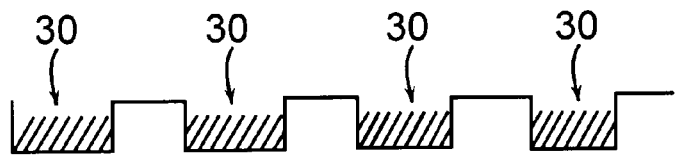
FIG. 7 shows a cross-sectional view of a anode flow field with hydrophilic strips.

If the fuel cell is expected to require humidification during operation, the surface of the cathode flow field 20 is generally covered with a hydrophilic strip 30 for absorbing and storing product water over the surface of the cathode flow field 20, as best shown in FIG. 6. Preferably, the hydrophilic strips 30 are also placed on the anode flow field 22 as shown in FIG. 7. Conditions that may cause the fuel cell to require humidification include prolonged use at relatively high power, relatively high currents, hot operating conditions, and the like.

The hydrophilic strips 30 are made from any inert hydrophilic material that maintains hydrophilic properties during the operating conditions of the cell, e.g. temperatures ranging up to about 75° C. Suitable materials for the hydrophilic strips include filter paper. Preferably, the hydrophilic strips are made of fiberglass filter paper. Suitable fiberglass filter paper may be obtained from Whatman International Limited, of Maidstone, England, particularly filter paper having GF/A, GF/B, GF/C, and GF/D grades.

The hydrophilic strips 30 have a thickness that ordinarily ranges from about 0.1 to about 2.5 mm, preferably from about 0.2 to about 2 mm, and even more preferably from about 0.5 to about 1.5 mm. The hydrophilic strips 30, however, may have other thicknesses, depending on factors such as the material of the strips, the dimensions of the channels, the amount of product water produced by the cell, and the like.

The hydrophilic strips 30 are made by forming strips from an appropriate material. For instance, a strip may simply be cut from a sheet of fiberglass filter paper and placed on the surface of a flow field. When a strip is placed over the surface of a cathode flow field, the strip must be pierced to expose the air distribution holes 18 as shown in FIG. 6. Although the hydrophilic strips 30 are currently the preferred means for uniformly absorbing and storing product water over reactant channel surfaces, the scope of this invention includes any equivalent structure that accomplishes this function. Generally, a hydrophilic strip is placed on each reactant channel.

The fuel cell of the invention is made by operatively associating a suitable number of membrane electrode assemblies, fluid flow plates, and any other components, i.e. current collector. In use, the fuel cell of this invention is electrically connected to a device or system that is to be powered. Hydrogen is introduced into the anode flow field 22 via a suitable fuel delivery system, and air is introduced into the cathode flow field 20 through the plate cooling channels 16 and the air distribution holes 18. The rate at that the fuel (hydrogen) is introduced into the anode flow field is sufficient to enable the cell to produce a desired amount of power. The power output of a single cell is determined by the product of the operating voltage of the cell and the output current. The rate for introducing hydrogen into the cell may be determined experimentally, i.e. by reading a flow meter. Alternatively, it can be determined mathematically from Faraday's Laws.

The rate at which air is introduced into the plate cooling channels is sufficient to cool the plate during operation and sufficient to provide enough oxygen to the cathode to produce power. The air may be introduced into the plate cooling channels with a fan or a blower (not shown), or by any other suitable means.

During operation, the hydrophilic strips 30 on the cathode flow field uniformly absorb and store product water over the surface of the flow field. Since product water is uniformly absorbed and stored, the water does not agglomerate and clog the reactant channels. Some of the water stored in hydrophilic strips 30 in the cathode flow field 20 passes through the membrane 37, humidifies the membrane 37, and thereby eliminates the need to use a humidifying system that introduces water from an external source into the cell. Some of the water stored in the strips 30 of the cathode flow field 20 may also pass into the anode flow field 22 where it helps maintain the anode moist during cell operation. To improve humidification of the anode flow field, hydrophilic strips are also placed on the anode flow field. Product water that would otherwise be exhausted in conventional cells, then, is utilized.

When hydrogen is introduced at the same or substantially same rate it is consumed, the fuel cell consumes substantially all of the hydrogen. Generally, the fuel consumption rate ranges from about 90% to about 100%, more preferably from about 95 to about 100%, and even more preferably from about 99 to about 100%.

The fuel cell may operate without interruption for extended periods of time, e.g. from 30 minutes to weeks. The fuel cell generates enough power to meet the needs of a specific application. Generally, the fuel cell generates at least 0.2 kw. Preferably, the cell generates from about 0.3 to about 15 kW, more preferably from about 0.5 to about 5 kW and even more preferably from about 1 to about 2 kW. The fuel cell may operate over a wide range of temperatures, i.e. from −20° C. to 100° C. or higher, preferably 20° C. to about 75° C. and even more preferably 40° C. to about 60° C.

The invention is described in the following examples. The examples are illustrative and do not limit the scope of this invention.

EXAMPLE 1

An air-cooled, hydrogen-air fuel cell of the invention having a stack assembly was prepared and operated to generate electricity. The fuel cell stack had one membrane electrode assembly operatively associated with two graphite bipolar plates. Each membrane electrode assembly was made from a solid polymer electrolyte membrane of Nafion® polymer, sandwiched between a cathode and an anode. The anode and the cathode used 1 mg/cm², 20% Pt/C loading. Each bipolar fluid flow plate had 20 circular plate cooling channels (with a diameter of 4 mm) extending from opposite sides of the plate. Each bipolar plate also had 420 circular air distribution holes (with a diameter of 3 mm) on its cathode flow field. Each plate had a length and a width of 6" (152.4 mm).

Figure 8:
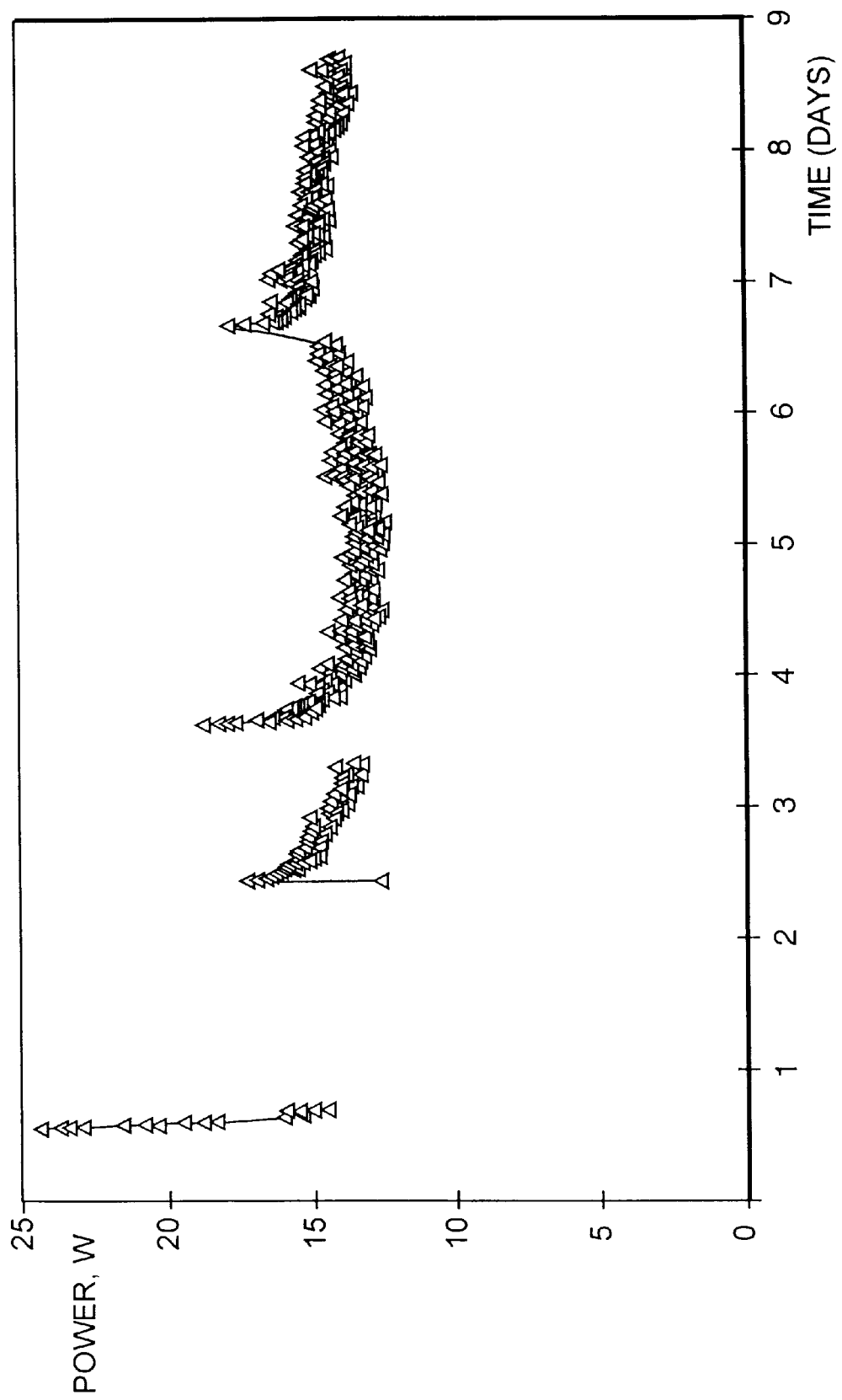
FIG. 8 shows a power output curve of a cell of this invention.

Air was introduced into the plate cooling channels with a fan, and hydrogen was introduced into the anode flow field from a hydrogen tank at 10 psig. FIG. 8 shows the power output of the cell at 0.5 V at 30 A during 10 days without interruptions. Not all of the data points are present in FIG. 8, because data acquisition software used in the experiment did not save all of the data. Deviations in the cell did not exceed 1 A.

EXAMPLE 2

The fuel utilization of the cell of Example 1 was determined. To determine the fuel utilization of the cell, the rate hydrogen was leaking from the cell was measured by applying a nominal hydrogen pressure of 10 psig to the cell and the hydrogen flow rate was measured when no load was attached to the cell. The leak rate was determined to be 5 cc/min. Then, the leak rate was subtracted from the rate hydrogen was being introduced into the cell (10 psig) and it was determined that the fuel cell had a 99.5% hydrogen utilization.

What is claimed is:

1. An air-cooled, hydrogen-air solid polymer electrolyte fuel cell comprising a membrane electrode assembly operatively associated with a fluid flow plate having at least one plate cooling channel extending through the plate from a first side to a second side of the plate and at least one air distribution hole extending from a surface of a cathode flow field into the plate cooling channel.

2. The fuel cell of claim 1, wherein the plate is made from a material selected from the group consisting of graphite, stainless steel, carbon composites, titanium, and niobium.

3. The fuel cell of claim 1, wherein the fluid flow plate has means for uniformly absorbing and storing product water over reactant channel surfaces.

4. The fuel cell of claim 3, wherein the means for uniformly absorbing and storing product water comprises a plurality of hydrophilic strips.

5. The fuel cell of claim 4, wherein the strips comprise an inert hydrophilic material that maintains its hydrophilic properties at temperatures ranging up to about 75° C.

6. The fuel cell of claim 4, wherein the strips comprise fiberglass filter paper.

7. The fuel cell of claim 4, wherein the hydrophilic strips hold a sufficient amount of product water to humidify the membrane without any external water supply.

8. The fuel cell of claim 1, wherein the fuel cell is a single cell assembly and has one membrane electrode assembly sandwiched between an anode fluid flow plate and a cathode fluid flow plate.

9. The fuel cell of claim 1, wherein the fuel cell comprises a plurality of membrane electrode assemblies, each membrane electrode assembly sandwiched between a pair of bipolar plates.

10. A method for generating electricity comprising:

(a) electrically connecting an air-cooled solid polymer electrolyte fuel cell to a device, wherein the cell comprises at least one membrane electrode assembly operatively associated with a bipolar fluid flow plate having at least one plate cooling channel extending through the plate from a first side to a second opposite side and at least one air distribution hole extending from a surface of a cathode flow field into the plate cooling channel;

(b) introducing hydrogen into an anode flow field of the bipolar plate; and (c) introducing air into the plate cooling channel and the air distribution hole;

to generate electricity.

11. The method of claim 10, further comprising the steps of introducing air into cathode flow fields having hydrophilic strips for uniformly absorbing and storing product water.

12. The method of claim 10 further comprising the step of storing product water in hydrophilic strips.

13. The method of claim 12 further comprising the step of passing some of the product water stored in the hydrophilic strips to the membrane and humidifying the membrane with said product water.

14. The method of claim 13, further comprising the step of transporting the product water stored in the hydrophilic strips to hydrophilic strips located on reactant channels on an anode flow field.

15. The method of claim 14, further comprising the steps of uniformly absorbing and storing water in the hydrophilic strips and humidifying the anode.

16. The method of claim 10, wherein the cell operates without interruption for at least 14 days.

17. The method of claim 10 further comprising the step of uniformly absorbing product water in hydrophilic strips.

* * * * *